United States Patent
Hwang et al.

(10) Patent No.: US 11,170,940 B2
(45) Date of Patent: Nov. 9, 2021

(54) TANTALUM CAPACITOR

(71) Applicant: SAMSUNG ELECTRO-MECHANICS CO., LTD., Suwon-si (KR)

(72) Inventors: Seon Uk Hwang, Suwon-si (KR); Young June Lee, Suwon-si (KR); Hyun Ho Shin, Suwon-si (KR); Hong Kyu Shin, Suwon-si (KR); Hyun Sub Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 35 days.

(21) Appl. No.: 16/774,706

(22) Filed: Jan. 28, 2020

(65) Prior Publication Data

US 2020/0365330 A1 Nov. 19, 2020

(30) Foreign Application Priority Data

May 17, 2019 (KR) .................. 10-2019-0058168
Aug. 6, 2019 (KR) .................. 10-2019-0095438

(51) Int. Cl.
*H01G 9/008* (2006.01)
*H01G 9/048* (2006.01)
(Continued)

(52) U.S. Cl.
CPC ............ *H01G 9/048* (2013.01); *H01G 9/008* (2013.01); *H01G 9/0029* (2013.01); *H01G 9/15* (2013.01); *H01G 2009/05* (2013.01)

(58) Field of Classification Search
None
See application file for complete search history.

(56) References Cited

U.S. PATENT DOCUMENTS 6,238,444 B1 * 5/2001 Cadwallader .......... H01G 9/012
29/25.03
8,289,678 B2 10/2012 Kim et al.
(Continued)

FOREIGN PATENT DOCUMENTS

CN 101609749 A 12/2009
CN 107527740 A 12/2017
(Continued)

OTHER PUBLICATIONS

Korean Office Action dated Oct. 22, 2020 issued in Korean Patent Application No. 10-2019-0095438 (with English translation).
(Continued)

*Primary Examiner* — Dion R. Ferguson
(74) *Attorney, Agent, or Firm* — Morgan, Lewis & Bockius LLP

(57) ABSTRACT

A tantalum capacitor includes a tantalum body, an encapsulation portion, first and second external electrodes spaced apart from each other on a lower surface of the encapsulation portion, a first plating layer disposed on one end surface of the encapsulation portion and a lower surface of the first external electrode to electrically connect the first external electrode and the tantalum body, an upper end of the first plating being comprised of a first bonding force improving portion contacting one upper edge of the encapsulation portion, and a second plating layer disposed on the other end surface of the encapsulation portion and a lower surface of the second external electrode to electrically connect the second external electrode and an exposed portion of a tantalum wire, an upper end of the second plating layer being comprised of a second bonding force improving portion contacting the other upper edge of the encapsulation portion.

19 Claims, 4 Drawing Sheets

(51) Int. Cl.
*H01G 9/00* (2006.01)
*H01G 9/04* (2006.01)
*H01G 9/15* (2006.01)

(56) References Cited

U.S. PATENT DOCUMENTS

| | | | |
|---|---|---|---|
| 10,903,017 B2 | 1/2021 | Demizu et al. | |
| 2002/0001169 A1* | 1/2002 | Shiraishi | H01G 9/012 361/523 |
| 2004/0066608 A1* | 4/2004 | Takagi | H01G 9/012 361/530 |
| 2009/0154066 A1* | 6/2009 | Choi | H01G 9/012 361/523 |
| 2009/0154068 A1* | 6/2009 | Choi | H01G 2/065 361/533 |
| 2009/0310283 A1* | 12/2009 | Kim | H01G 9/0425 361/523 |
| 2017/0099727 A1 | 4/2017 | Son | |
| 2017/0140877 A1* | 5/2017 | Kuromi | H01G 9/10 |
| 2017/0365415 A1* | 12/2017 | Demizu | H01G 9/048 |
| 2017/0365419 A1* | 12/2017 | Demizu | H01G 9/012 |
| 2019/0237266 A1* | 8/2019 | Tsutsumi | H01G 9/14 |
| 2019/0244765 A1* | 8/2019 | Harada | H01G 9/045 |
| 2020/0335284 A1* | 10/2020 | Yamazaki | H01G 9/14 |

FOREIGN PATENT DOCUMENTS

| | | |
|---|---|---|
| JP | 2007-165477 A | 6/2007 |
| JP | 2008-108931 A | 5/2008 |
| KR | 10-2002-0055866 A | 7/2002 |
| KR | 10-2015-0010685 A | 1/2015 |
| KR | 10-2017-0039390 A | 4/2017 |

OTHER PUBLICATIONS

Chinese Office Action dated Jul. 26, 2021 issued in Chinese Patent Application No. 202010258289.2 (with English translation).

\* cited by examiner

TANTALUM CAPACITOR

CROSS-REFERENCE TO RELATED APPLICATIONS

The present application claims the benefit of priority to Korean Patent Application No. 10-2019-0058168 filed on May 17, 2019 and Korean Patent Application No. 10-2019-0095438 filed on Aug. 6, 2019 in the Korean Intellectual Property Office, the entire disclosures of which are incorporated herein by reference.

TECHNICAL FIELD

The present disclosure relates to a tantalum capacitor.

BACKGROUND

Tantalum capacitors are electronic components used in passive component intensive products such as TVs, mobile devices, notebook computers, tablet PCs, automotive electrical components, and the like.

There has been an increasing demand for tantalum capacitors capable of implementing small size and high capacity, and to this end, it is necessary to increase the width of a dielectric per unit area.

Thus, there is disclosed a tantalum capacitor having a structure in which a lower surface electrode used as a terminal is connected to a tantalum body and a tantalum wire, without using a separate connection frame.

However, in the tantalum capacitor that does not use the related art connection frame, a plated layer is bonded to various portions in terms of the structure, and in detail, is most widely in contact with an encapsulation portion encapsulating the tantalum body, and thus the adhesion between the plated layer and the encapsulation portion is important.

To secure the adhesion between the plated layer and the encapsulation portion, various plating pre-treatment and post-treatment are performed. Nevertheless, the related art method has a limitation in increasing the adhesion between the plated layer and the encapsulation portion.

The information included in this Background section is only for enhancement of understanding of the general background of the present disclosure and may not be taken as an acknowledgement or any form of suggestion that this information forms the prior art already known to a person skilled in the art.

SUMMARY

This Summary section is provided to introduce a selection of concepts in a simplified form that are further described below in the Detailed Description section. This Summary section is not intended to identify key features or essential features of the claimed subject matter, nor is it intended to be used as an aid in determining the scope of the claimed subject matter.

An aspect of the present disclosure is to provide a tantalum capacitor in which poor bonding between a plating layer and an encapsulation portion may be prevented, while reducing the size and improving the capacity.

According to an aspect of the present disclosure, a tantalum capacitor includes a tantalum body including tantalum powder; a tantalum wire disposed in the tantalum body and having one end exposed to one surface of the tantalum body in a length direction; an encapsulation portion encapsulating the tantalum body; first and second external electrodes spaced apart from each other in the length direction and disposed on a lower surface of the encapsulation portion in a thickness direction; a first plating layer disposed on a first end surface of the encapsulation portion in the length direction and a lower surface of the first external electrode in the thickness direction to electrically connect the first external electrode to the tantalum body, wherein an upper end of the first plating includes a first bonding force improving portion contacting one upper edge of the encapsulation portion; and a second plating layer disposed on a second end surface of the encapsulation portion in the length direction and a lower surface of the second external electrode in the thickness direction to electrically connect the second external electrode to an exposed portion of the tantalum wire, wherein an upper end of the second plating layer includes a second bonding force improving portion contacting another upper edge of the encapsulation portion.

The encapsulation portion may include two upper edges on an upper surface of the encapsulation portion and has two inclined surfaces at the two upper edges, respectively, in the length direction. The first plating layer may include a first horizontal portion disposed on the lower surface of the first external electrode, a first vertical portion extending from the first horizontal portion in the thickness direction and disposed on the first end surface of the encapsulation portion, and the first bonding force improving portion bent from an upper end of the first vertical portion and extending along and onto one inclined surface of the two inclined surfaces. The second plating layer may include a second horizontal portion disposed on the lower surface of the second external electrode, a second vertical portion extending from the second horizontal portion in the thickness direction and disposed on the second end surface of the encapsulation portion, and the second bonding force improving portion bent from an upper end of the second vertical portion and extending along and onto another inclined surface of the two inclined surfaces.

The encapsulation portion may have two upper edges on an upper surface of the encapsulation portion and has two curved surfaces at the two upper edges, respectively, in the length direction. The first plating layer may include a first horizontal portion disposed on the lower surface of the first external electrode, a first vertical portion extending from the first horizontal portion in the thickness direction and disposed on the first end surface of the encapsulation portion, and the first bonding force improving portion bent from an upper end of the first vertical portion and extending along and onto one curved surface of the two curved surfaces. The second plating layer may include a second horizontal portion disposed on the lower surface of the second external electrode, a second vertical portion extending from the second horizontal portion in the thickness direction and disposed on the second end surface of the encapsulation portion, and the second bonding force improving portion bent from an upper end of the second vertical portion and extending along and onto another curved surface of the two curved surfaces.

Each of the first and second bonding force improving portions may have a shape convexly curved upwardly.

Each of the first and second bonding force improving portions may have a shape concavely curved upwardly.

The encapsulation portion may include a first reduced-thickness portion and a second reduced-thickness portion in the thickness direction, the first and second reduced-thickness portions being respectively disposed in two end portions of an upper surface of the encapsulation portion opposing each other in the length direction. The first plating layer may include a first horizontal portion disposed on the lower surface of the first external electrode, a first vertical portion extending from the first horizontal portion in the thickness direction and disposed on the first end surface of the encapsulation portion, and the first bonding force improving portion bent from an upper end of the first vertical portion to be disposed in the first reduced-thickness portion of the encapsulation portion. The second plating layer may include a second horizontal portion disposed on the lower surface of the second external electrode, a second vertical portion extending from the second horizontal portion in the thickness direction and disposed on the second end surface of the encapsulation portion, and the second bonding force improving portion bent from an upper end of the second vertical portion to be disposed in the second reduced-thickness portion of the encapsulation portion.

According to another aspect of the present disclosure, a tantalum capacitor includes a tantalum body including tantalum powder; a tantalum wire disposed in the tantalum body and exposed to one surface thereof; an encapsulation portion encapsulating the tantalum body and having first and second surfaces opposing each other, third and fourth surfaces connecting the first and second surfaces to each other and opposing each other, and fifth and sixth surfaces connecting the first and the second surfaces to each other, connecting the third and fourth surfaces to each other, and opposing each other, wherein an end of the tantalum wire is exposed through the fourth surface, and the encapsulation portion further includes first and second inclined surfaces that are inclined with respect to the third and fourth surfaces, respectively; first and second external electrodes spaced apart from each other on the first surface of the encapsulation portion; a first plating layer covering the third surface of the encapsulation portion and a first surface of the first external electrode, wherein one end of the first plating layer includes a first bonding force improving portion inclined to be disposed on the first inclined surface of the encapsulation portion; and a second plating layer covering the fourth surface of the encapsulation portion and a first surface of the second external electrode and connected to the tantalum wire, wherein one end of the second plating layer includes a second bonding force improving portion inclined to be disposed on the second inclined surface of the encapsulation portion.

The inclined surfaces of the encapsulation portion may be flat. The first plating layer may include a first horizontal portion disposed on the first surface of the first external electrode, a first vertical portion extending from the first horizontal portion and disposed on the third surface of the encapsulation portion, and the first bonding force improving portion bent from one end of the first vertical portion and extending along and onto the first inclined surface of the encapsulation portion. The second plating layer may include a second horizontal portion disposed on the first surface of the second external electrode, a second vertical portion extending from the second horizontal portion and disposed on the fourth surface of the encapsulation portion, and the second bonding force improving portion bent from one end of the second vertical portion and extending along and onto the second inclined surface of the encapsulation portion.

The first and second inclined surfaces of the encapsulation portion are curved. The first plating layer may include a first horizontal portion disposed on the first surface of the first external electrode, a first vertical portion extending from the first horizontal portion and disposed on the third surface of the encapsulation portion, and the first bonding force improving portion bent from one end of the first vertical portion and curved to extend along and onto the first inclined surface of the encapsulation portion. The second plating layer may include a second horizontal portion disposed on the first surface of the second external electrode, a second vertical portion extending from the second horizontal portion and disposed on the fourth surface of the encapsulation portion, and the second bonding force improving portion bent from one end of the second vertical portion and curved to extend along and onto the second inclined surface of the encapsulation portion.

Each of the first and second bonding force improving portions may have a shape convexly curved upwardly.

Each of the first and second bonding force improving portions may have a shape concavely curved upwardly.

An insulating layer may be arranged between the encapsulation portion and the first and second external electrodes.

The tantalum capacitor may further include a conductive binder disposed on a first surface of the tantalum body facing the first surface of the encapsulation portion; and a connection electrode disposed on one surface of the insulating layer in to be connected to the conductive binder.

The tantalum capacitor may further include a conductive binder disposed between the tantalum body and a first vertical portion of the first plating layer, the first vertical portion being disposed on the third surface of the encapsulation portion.

According to another aspect of the present disclosure, a tantalum capacitor includes a tantalum body including tantalum powder; a tantalum wire disposed in the tantalum body and having one end exposed to one surface of the tantalum body in a length direction; an encapsulation portion encapsulating the tantalum body; first and second external electrodes spaced apart from each other in the length direction and disposed on a lower surface of the encapsulation portion in a thickness direction; a first plating layer disposed on a first end surface of the encapsulation portion in the length direction and a lower surface of the first external electrode in the thickness direction to electrically connect the first external electrode to the tantalum body; and a second plating layer disposed on a second end surface of the encapsulation portion in the length direction and a lower surface of the second external electrode in the thickness direction to electrically connect the second external electrode to an exposed portion of the tantalum wire, wherein each of the first and second plating layers includes an upper end bent inwardly toward a center of the encapsulation portion.

The encapsulation portion may include two upper edges on an upper surface of the encapsulation portion and has two inclined surfaces at the two upper edges, respectively, in the length direction. Inwardly bent portions of the first and second plating layers may extend along and onto the two inclined surfaces, respectively. The inwardly bent portions may be flat.

The encapsulation portion may have two upper edges on an upper surface of the encapsulation portion and has two curved surfaces at the two upper edges, respectively, in the length direction. Inwardly bent portions of the first and second plating layers may extend along and onto the two curved surfaces, respectively, and the inwardly bent portions may be curved.

The first plating layer may include a first horizontal portion disposed on the lower surface of the first external electrode and a first vertical portion extending from the first horizontal portion in the thickness direction and disposed on the first end surface of the encapsulation portion. The second plating layer may include a second horizontal portion disposed on the lower surface of the second external electrode and a second vertical portion extending from the second horizontal portion in the thickness direction and disposed on the second end surface of the encapsulation portion.

The encapsulation portion may include a first reduced-thickness portion and a second reduced-thickness portion in the thickness direction, the first and second reduced-thickness portions respectively disposed in two end portions of an upper surface of the encapsulation portion opposing each other in the length direction.

The first plating layer may include a first horizontal portion disposed on the lower surface of the first external electrode, a first vertical portion extending from the first horizontal portion in the thickness direction and disposed on the first end surface of the encapsulation portion, and the first bonding force improving portion bent from an upper end of the first vertical portion to be disposed in the first reduced-thickness portion of the encapsulation portion. The second plating layer may include a second horizontal portion disposed on the lower surface of the second external electrode, a second vertical portion extending from the second horizontal portion in the thickness direction and disposed on the second end surface of the encapsulation portion, and the second bonding force improving portion bent from an upper end of the second vertical portion to be disposed in the second reduced-thickness portion of the encapsulation portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
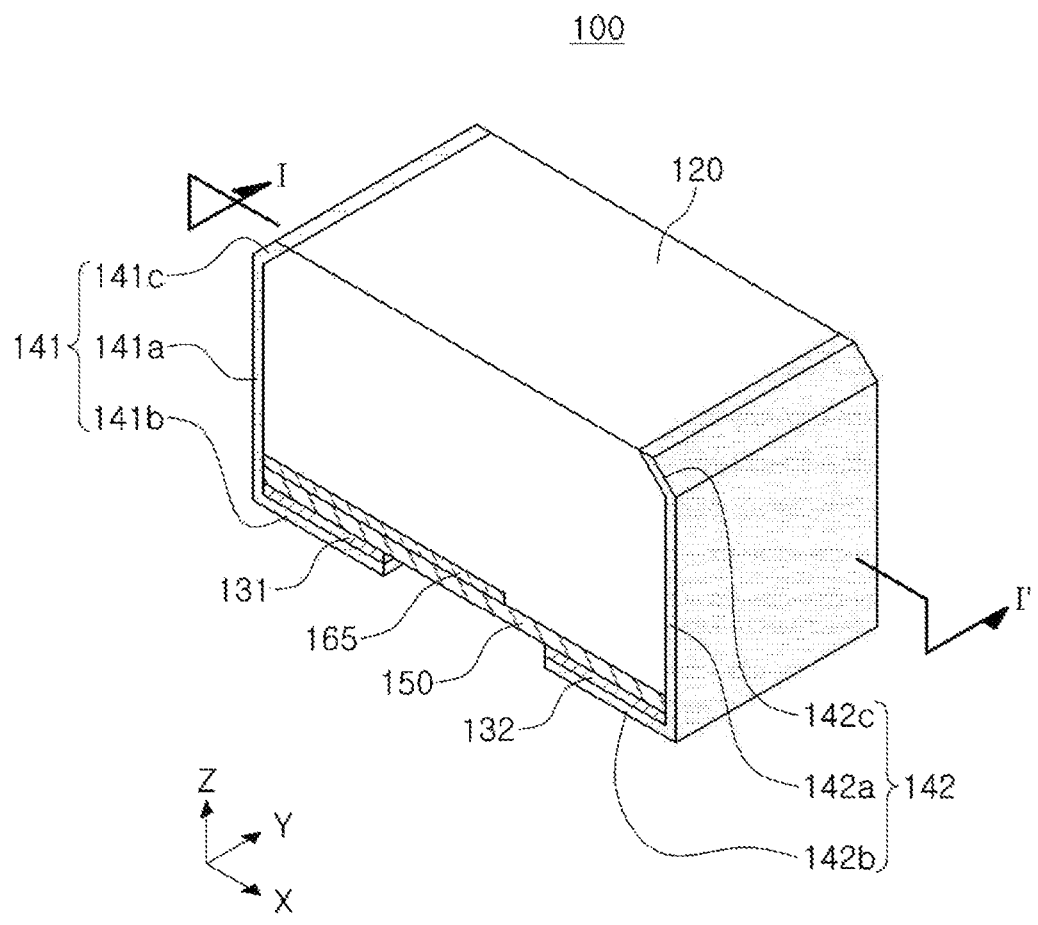
FIG. 1 is a schematic perspective view of a tantalum capacitor according to an exemplary embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

Reference directions are defined to describe exemplary embodiments of the present disclosure. A front direction is a direction in which a tantalum wire is exposed externally of a tantalum body. A rear direction is a direction opposite to the front direction, where the front and rear directions define a length direction of the tantalum capacitor. The tantalum body has two end surfaces arranged in the length direction and upper and lower surfaces arranged in a thickness direction, which is perpendicular to the length direction. According to one exemplary embodiment of the present disclosure, external electrodes are disposed on a lower surface of an encapsulation portion of the tantalum capacitor in the thickness direction. A width direction of the tantalum capacitor is a direction in which two side surfaces of the tantalum body are facing, and the length, width, and thickness directions are orthogonal to each other.

X, Y and Z illustrated in the drawings may represent the length direction, the width direction and the thickness direction of the tantalum capacitor, respectively.

In addition, surfaces of the encapsulation portion according to one exemplary embodiment of the present disclosure are defined as follows. The encapsulation portion includes first and second surfaces opposing each other in the Z direction, third and fourth surfaces connecting the first and second surfaces to each other and opposing each other in the X direction, and fifth and sixth surfaces connecting the first and second surfaces to each other, connecting the third and fourth surfaces to each other, and opposing each other in the Y direction.

Figure 2:
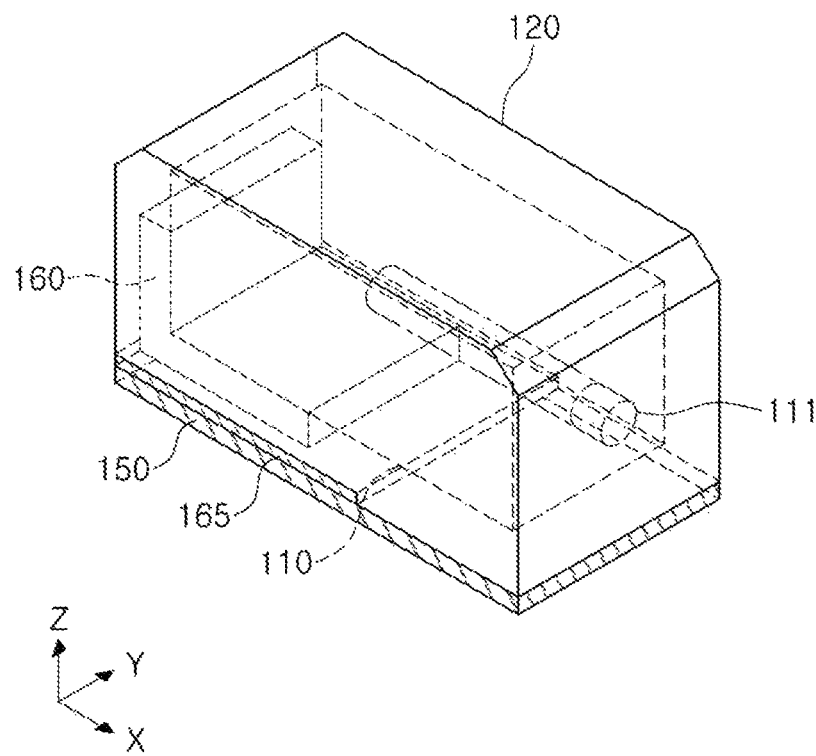
FIG. 2 is a transparent perspective view illustrating a tantalum body, a tantalum wire, an encapsulation portion, a conductive binder, and an insulating layer in FIG. 1.
Figure 3:
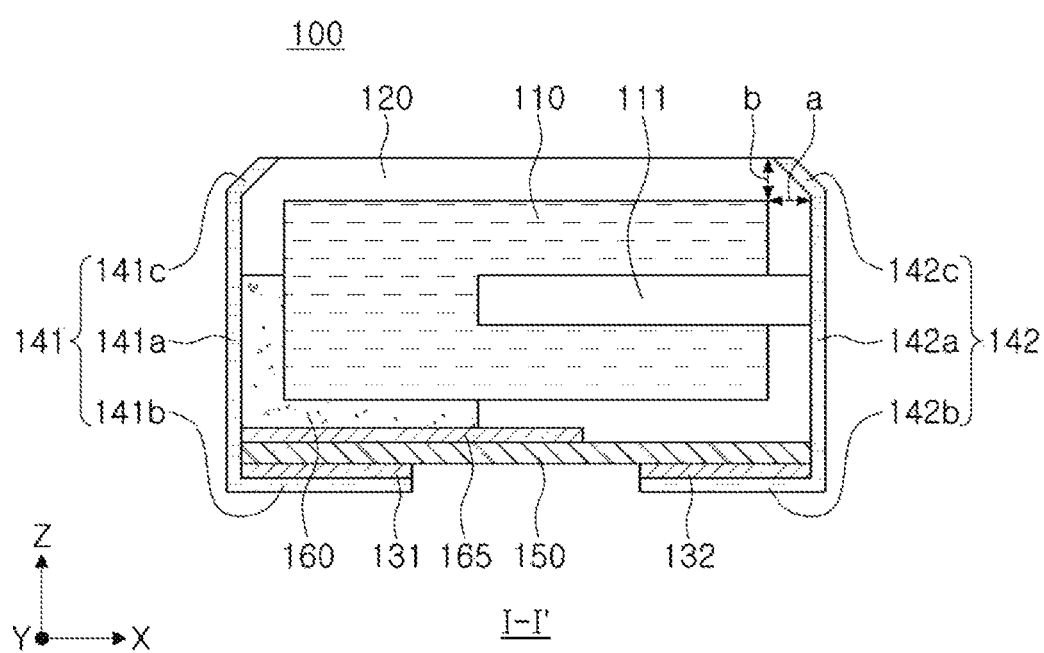
FIG. 3 is a cross-sectional view taken along line I-I' of FIG. 1.

FIG. 1 is a perspective view schematically illustrating a tantalum capacitor according to an exemplary embodiment of the present disclosure, FIG. 2 is a transparent perspective view illustrating a tantalum body, a tantalum wire, an encapsulation portion, a conductive binder, and an insulating layer in FIG. 1, and FIG. 3 is a cross-sectional view taken along line I-I' of FIG. 1.

Referring to FIGS. 1 to 3, a tantalum capacitor 100 according to an exemplary embodiment of the present disclosure includes a tantalum body 110, first and second external electrodes 131 and 132, first and second plating layers 141 and 142, and an encapsulation portion 120.

In this case, the encapsulation portion 120 may be formed in such a manner that upper edges of the third and fourth surfaces have inclinations, respectively.

In this embodiment, the first plating layer 141 is disposed on the third surface of the encapsulation portion 120 and a lower surface of the first external electrode 131 to electrically connect the first external electrode 131 and the tantalum body 110, and an upper end of the first plating layer 141 is inclined and is formed as a first bonding force improving portion 141c in contact with one upper edge of the encapsulation portion 120.

The second plating layer 142 is disposed on the fourth surface of the encapsulation portion 120 and a lower surface of the second external electrode 132 to electrically connect the second external electrode 132 and an exposed portion of a tantalum wire 111. An upper end of the second plating layer 142 is inclined and formed as a second bonding force improving portion 142c in contact with the other upper edge of the encapsulation portion 120.

The first and second bonding force improving portions 141c and 142c, according to an exemplary embodiment of the present disclosure, are bent inwardly toward a center of the encapsulation portion 120.

The tantalum body 110 may be formed of a tantalum material. As an example, tantalum powder and a binder may be mixed at a predetermined ratio and stirred, and the mixed powder may be compressed and molded into a substantially rectangular parallelepiped shape, followed by sintering under high temperature and high vibration, thereby manufacturing the tantalum body 110.

The tantalum body 110 has the tantalum wire 111 exposed to one end surface in the front direction.

The tantalum wire 111 may be inserted into the mixture of the tantalum powder and the binder to be eccentric from the center thereof before compressing the mixture powder of the tantalum powder and the binder.

For example, the tantalum body 110 may be manufactured by inserting the tantalum wire 111 into the tantalum powder mixed with a binder to form a tantalum element having a required size, and then sintering the tantalum element in a high temperature and high vacuum atmosphere.

The encapsulation portion 120 encapsulates the tantalum body 110 in such a manner that the tantalum wire 111 is exposed through the fourth surface that is an end surface on one side thereof.

The encapsulation portion 120 may be formed by transfer molding a resin such as an epoxy molding compound (EMC) or the like to surround the tantalum body 120.

The encapsulation portion 120 may serve to protect the tantalum wire 111 and the tantalum body 110 from externally.

The first external electrode 131 may be formed of a conductive metal, may be disposed to be exposed to the lower surface of the encapsulation portion 120, and may be electrically connected to the tantalum body 110.

The second external electrode 132 may be formed of a conductive metal, may be spaced apart from the first external electrode 131 in the X direction, the length direction of the tantalum body 110, may be disposed to be exposed to the lower surface of the encapsulation portion 120, and may be electrically connected to the tantalum wire 111.

The first plating layer 141 includes a first horizontal portion 141b, a first vertical portion 141a, and a first bonding force improving portion 141c.

The first horizontal portion 141b is exposed to the lower surface of the encapsulation portion 120 to serve as a terminal at the time of mounting on a substrate.

In this case, the first horizontal portion 141b may be disposed on a lower surface of the first external electrode 131.

The first vertical portion 141a is a portion that is bent and extended in the Z direction from one end of the first horizontal portion 141b and joined to the third surface, which is one end surface of the encapsulation portion 120.

The first bonding force improving portion 141c is a portion provided on an upper end of the first vertical part 141a and is bent from the upper end of the first vertical part 141a at an angle inclined toward the tantalum body 110.

In this embodiment, one upper edge of the encapsulation portion 120 is formed as an inclined surface that is inclined inwardly, and the first bonding force improving portion 141c may be joined to the inclined surface of one upper end of the encapsulation portion 120. In this case, the inclined surface may be formed as a flat surface.

The second plating layer 142 includes a second horizontal portion 142b, a second vertical portion 142a, and the second bonding force improving portion 142c.

The second horizontal portion 142b is exposed to the lower surface of the encapsulation portion 120 and is spaced apart from the first horizontal portion 141b in the length direction, to serve as a terminal at the time of mounting on a substrate.

In this case, the second horizontal portion 142b may be disposed on the lower surface of the second external electrode 132.

The second vertical portion 142a is a portion that is bent and extended in the vertical direction from one end of the second horizontal portion 142b and joined to the other end surface of the encapsulation portion 120.

The second vertical portion 142a may be in contact with and electrically connected to the tantalum wire 111 exposed through the other end surface of the encapsulation portion 120.

The second bonding force improving portion 142c is a portion provided on an upper end of the second vertical portion 142a and is extended to be bent by a predetermined angle toward the tantalum body 110 from the upper end of the second vertical part 142a.

In this embodiment, the other end upper edge of the encapsulation portion 120 is formed as an inclined surface inclined inwardly, and the second bonding force improving portion 142c may be bonded to the inclined surface of the other end upper edge of the encapsulation portion 120. In this case, the inclined surface may be formed as a flat surface.

In the case of the related art tantalum capacitor, a plating layer is formed in a substantial L-shape on an outer surface of an encapsulation portion. In this case, since the bonding strength between the plating layer and an encapsulation portion is relatively weak, there is a problem in which the plating layer is easily separated from the encapsulation portion.

In this embodiment, the two upper edges of the encapsulation portion 120 in the X direction are formed to be inclined inwardly, and in the case of the first and second plating layers 141 and 142, upper ends of the first and second vertical portions 141a and 142a thereof are formed as the first and second bonding force improving portions 141c and 142c inclined inward to correspond to the shape of the upper edges of the encapsulation portion 120, thereby increasing the area of contact between the encapsulation portion 120 and the first and second plating layers 141 and 142 and effectively preventing separation of the first and second plating layers 141 and 142 in a lowest bonding force region with the first and second plating layers 141 and 142.

In addition, an insulating layer 150 may be disposed on the lower surface of the encapsulation portion 120 to be positioned between the first and second external electrodes 131 and 132.

In this embodiment, to form the encapsulation portion 120 and form the first and second plating layers 141 and 142, first, a portion on which the tantalum body 110 is mounted and fixed thereto is required, and the insulating layer 150 may serve to support the tantalum body 110 as described above.

The first and second external electrodes 131 and 132 are disposed on a lower surface of the insulating layer 150 to be spaced apart from each other in the X direction, and the insulating layer 150 may be formed of an insulator such as FR4, thereby preventing the first and second external electrodes 131 and 132 from being electrically connected to each other.

A conductive binder 160 may be further provided between the tantalum body 110 and the insulating layer 150 and between the tantalum body 110 and the first vertical portion 141a of the first plating layer 141.

The conductive binder 160 may include, in detail, silver (Ag), but an embodiment thereof is not limited thereto.

A connection electrode 165 may be disposed on an upper surface of the insulating layer 150.

The connection electrode 165 may be formed of a metal such as copper (Cu), and one end of the connection electrode 165 may be in contact with and electrically connected to the first vertical portion 141a of the first external electrode 141.

The conductive binder 160 may be formed to a lower surface of the tantalum body 110, and in this case, the conductive binder 160 may contact the upper surface of the connection electrode 165 to be electrically connected thereto.

Therefore, the connection electrode 165 may serve to improve the adhesion and conductivity of the conductive binder 160.

Figure 4:
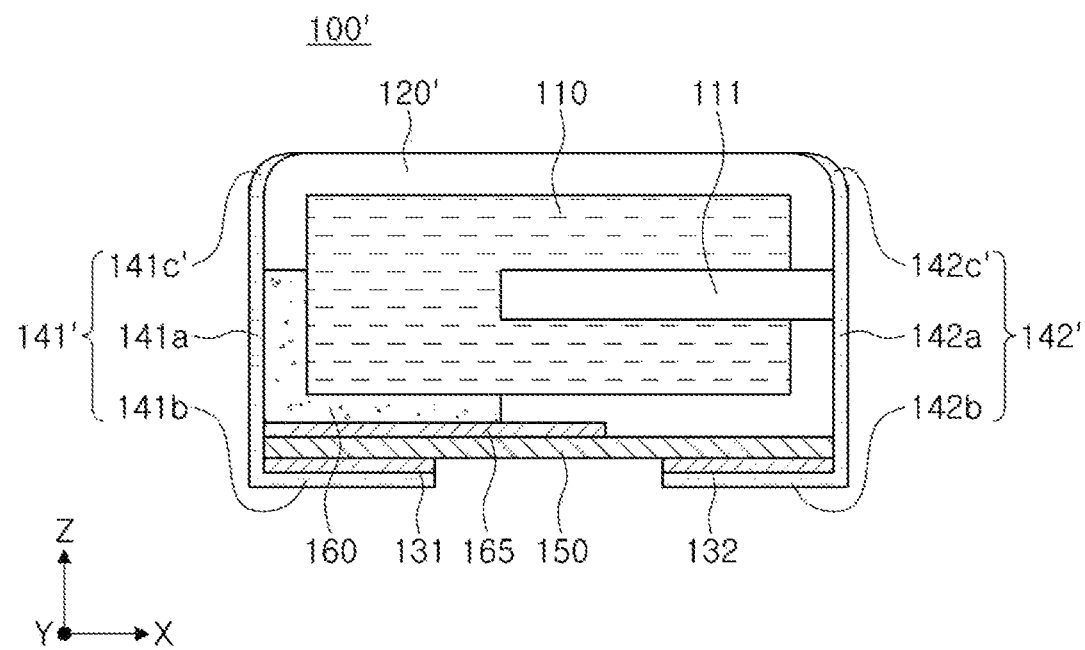
FIG. 4 is a cross-sectional view schematically illustrating a tantalum capacitor in a length-thickness direction according to another exemplary embodiment of the present disclosure.

Referring to FIG. 4, in a tantalum capacitor 100' according to another exemplary embodiment of the present disclosure, an encapsulation portion 120' may be configured in such a manner that an upper edge of one end and an upper edge of the other end respectively have a curved surface in the X direction.

In this case, the curved surface may be formed as, in detail, a gentle curved surface.

The curved surface may have a shape that is convexly curved upwardly in the Z direction.

Accordingly, a first bonding force improving portion 141c' of a first plating layer 141' may have a shape that is roundly curved toward a tantalum body 110 to correspond to a curved shape of one upper edge of the encapsulation portion 120'.

The first bonding force improving portion 141c' may have a shape that is convexly curved upward in the Z direction.

In this case, a bending angle of the first bonding force improving portion 141c' may be appropriately changed as required.

A second bonding force improving portion 142c' of a second plating layer 142' may have a shape that is roundly curved toward the tantalum body 110 to correspond to a curved shape of an upper edge of the other end of the encapsulation portion 120'.

The second bonding force improving portion 142c' may have a shape that is convexly curved upward in the Z direction.

In this case, a bending angle of the second bonding force improving portion 142c' may be appropriately changed as required.

In this embodiment, according to the structure of the encapsulation portion 120' and the first and second plating layers 141' and 142' as described above, contact areas of upper end portions (which may have relatively weak bonding force) of the encapsulation portion 120', contacting the first and second plating layers 141' and 142', may be increased, thereby increasing adhesion therebetween.

In this embodiment, the contact area between the encapsulation portion 120' and the first and second plating layers 141' and 142' may be further increased as compared to the structure of FIG. 3, and thus, the adhesion of the first and second plating layers 141' and 142' may also be further increased as compared with the adhesion of the structure of FIG. 3.

Accordingly, the first and second plating layers 141' and 142' may be more effectively prevented from being unexpectedly peeled off from the encapsulation portion 120'.

Figure 5:
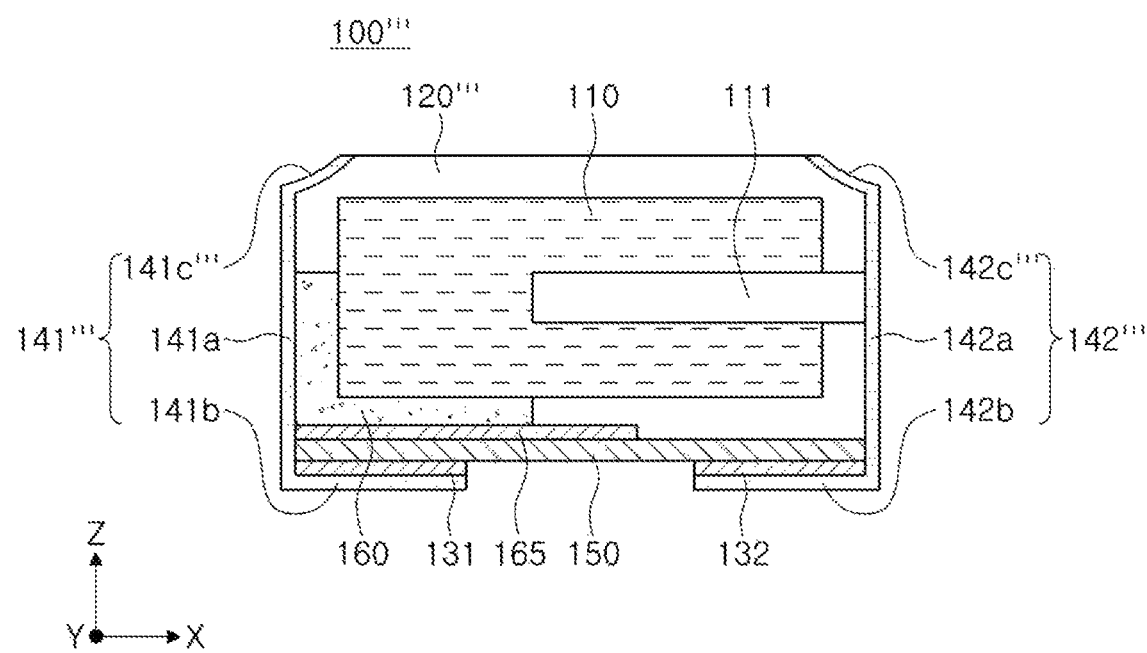
FIG. 5 is a cross-sectional view of a tantalum capacitor in a length-thickness direction according to another exemplary embodiment of the present disclosure.

Referring to FIG. 5, in a tantalum capacitor 100''' according to another embodiment, an encapsulation portion 120''' may be formed in such a manner that an upper edge of one end and an upper edge of the other end in the X direction have a curved surface, respectively.

In this case, the curved surface may be formed as, in detail, a gentle curved surface.

The curved surface may have a shape that is concavely curved upward in the Z direction.

Accordingly, a first bonding force improving portion 141c''' of a first plating layer 141''' may have a shape that is curved roundly toward a tantalum body 110 to correspond to a curved shape of one upper edge of the encapsulation portion 120'''.

The first bonding force improving portion 141c''' may have a shape that is concavely curved upward in the Z direction.

A second bonding force improving portion 142c''' of a second plating layer 142''' may have a shape that is roundly curved toward the tantalum body 110 to correspond to a curved shape of an upper edge of the other end of the encapsulation portion 120'''.

The second bonding force improving portion 142c''' may have a shape that is concavely curved upward in the Z direction.

In this embodiment, according to the structure of the encapsulation portion 120''' and the first and second plating layers 141''' and 142''' as described above, contact areas of upper end portions (which may have relatively weak bonding force) of the encapsulation portion 120''', contacting the first and second plating layers 141''' and 142''', may be increased, thereby increasing adhesion therebetween.

Thus, the first and second plating layers 141''' and 142''' may be more effectively prevented from being unexpectedly peeled off from the encapsulation portion 120'''.

Figure 6:
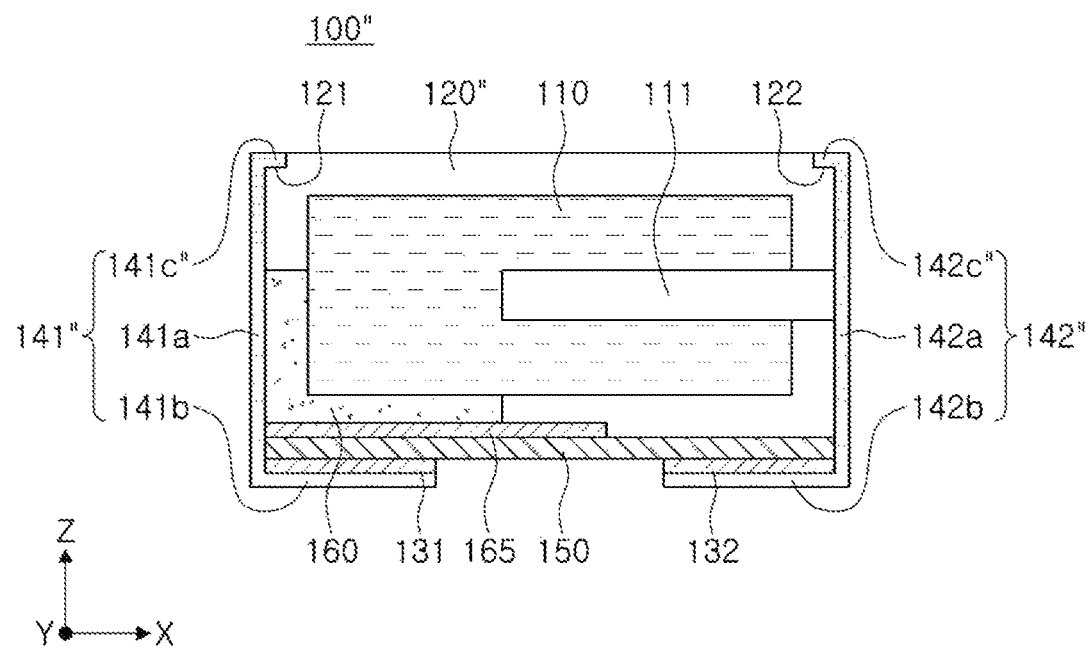
FIG. 6 is a schematic cross-sectional view of a tantalum capacitor in a length-thickness direction according to another exemplary embodiment of the present disclosure.

Referring to FIG. 6, in the case of a tantalum capacitor 100'' according to another exemplary embodiment of the present disclosure, an encapsulation portion 120'' may have first and second grooves 121 and 122 formed in one upper edge and the other upper edge thereof, respectively. In this case, the first and second grooves 121 and 122 may be formed to have stepped shapes that are exposed outwardly in the X direction, respectively. The first and second grooves 121 and 122 may be reduced-thickness portions in the Z direction.

Accordingly, a first bonding force improving portion 141c'' of a first plating layer 141'' is a portion that is bent toward a tantalum body 110 from an upper end of a first vertical portion 141a, and may have a shape corresponding to that of the first groove 121 formed in one upper edge of the encapsulation portion 120'', and may disposed in the first groove 121.

A second bonding force improving portion 142c'' of a second plating layer 142'' is a portion that is bent toward the tantalum body 110 from an upper end of a second vertical portion 142a, and may have a shape corresponding to that of the second groove 122 formed in the other upper edge of the encapsulation portion 120'' and may be disposed in the second groove 122.

According to this configuration, the upper surface of the tantalum capacitor 100'' that includes the encapsulation portion 120'', the first bonding force improving portion 141c'', and the second bonding force improving portion 142c'' may form one flat surface.

In this embodiment, according to the structure of the encapsulation portion 120'', upper end portions (which may have relatively weak bonding force) of the encapsulation portion 120'', contacting the first and second plating layers 141'' and 142'', may be formed to have a step-like shape, thereby increasing an area of contact between the encapsulation portion 120'' and the first and second plating layers 141'' and 142'' and thus, increasing adhesion therebetween.

Thus, the first and second plating layers 141'' and 142'' may be more effectively prevented from being unexpectedly peeled off from the encapsulation portion 120''.

Figure 7:
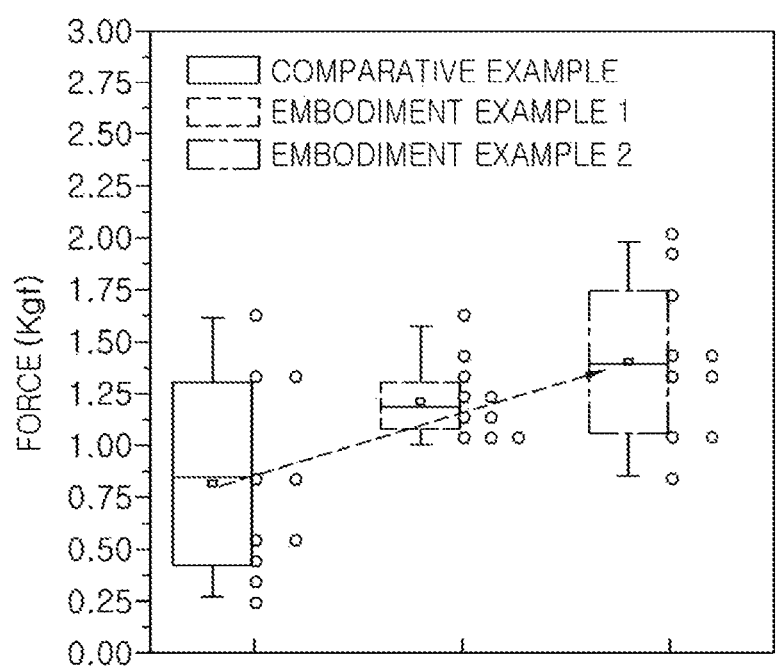
FIG. 7 is a graph of results by measuring and comparing the adhesion between the related art tantalum capacitor and a tantalum capacitor according to an exemplary embodiment of the present disclosure.

FIG. 7 is a graph illustrating results of measuring and comparing the adhesion of the related art tantalum capacitor and a tantalum capacitor according to an exemplary embodiment of the present disclosure after testing using a PCB.

In the comparative example of FIG. 7, an encapsulation portion is hexahedral and the first and second plating layers do not have first and second bonding force improving portions, and is formed to have an L shape.

Embodiment example 1 of the present disclosure is a tantalum capacitor having the structure illustrated in FIG. 3, in which the surface after plating is not polished, and Embodiment example 2 is a tantalum capacitor having the structure illustrated in FIG. 3, in which the surface after plating is polished.

In FIG. 3, a is 75 μm and b is 50 μm. The tantalum capacitors of the comparative example and Embodiment examples 1 and 2 are 3.2 mm in length in the X direction and 1.6 mm in length in the Y direction.

Referring to FIG. 7, in the case of the tantalum capacitors according to Embodiment examples 1 and 2, upper edges of the encapsulation portions are formed to have an inclination, and the first and second plating layers include the first and second bonding force improving portions, respectively.

Therefore, in Embodiment Examples 1 and 2, it can be seen that the adhesion between the encapsulation portion and the plating layer is improved by about 40% on average and the scattering is reduced, compared to those of the comparative example.

In addition, in Embodiment example 2, the adhesion of the plating layer may be further improved by the polishing process.

As set forth above, according to an exemplary embodiment of the present disclosure, two upper edges of an encapsulation portion are formed to have an inclination, and upper ends of first and second plating layers are formed as first and second bonding force improving portions having shapes corresponding to those of the upper edges of the encapsulation portion, respectively. Such first and second bonding force improving portions can increase a contact area between the plating layer and the encapsulation portion, thereby improving bonding strength of the plating layer and preventing separation of the plating layer from the encapsulation portion.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A tantalum capacitor comprising:
a tantalum body including tantalum powder;
a tantalum wire disposed in the tantalum body and having one end exposed to one surface of the tantalum body in a length direction;
an encapsulation portion encapsulating the tantalum body;
first and second external electrodes spaced apart from each other in the length direction and disposed on a lower surface of the encapsulation portion in a thickness direction;
a first plating layer disposed on a first end surface of the encapsulation portion in the length direction and a lower surface of the first external electrode in the thickness direction to electrically connect the first external electrode to the tantalum body, wherein an upper end of the first plating includes a first bonding force improving portion contacting one upper edge of the encapsulation portion; and
a second plating layer disposed on a second end surface of the encapsulation portion in the length direction and a lower surface of the second external electrode in the thickness direction to electrically connect the second external electrode to an exposed portion of the tantalum wire, wherein an upper end of the second plating layer includes a second bonding force improving portion contacting another upper edge of the encapsulation portion,
wherein the first and second bonding force improving portions each have any one of a flat shape with an inclined angle, a flat shape extending along a cutout groove of the encapsulation portion, or a shape concavely curved upwardly.

2. The tantalum capacitor of claim 1, wherein the encapsulation portion includes two upper edges on an upper surface of the encapsulation portion and has two inclined surfaces at the two upper edges, respectively, in the length direction,
the first plating layer includes a first horizontal portion disposed on the lower surface of the first external electrode, a first vertical portion extending from the first horizontal portion in the thickness direction and disposed on the first end surface of the encapsulation portion, and the first bonding force improving portion bent from an upper end of the first vertical portion and extending along and onto one inclined surface of the two inclined surfaces, and
the second plating layer includes a second horizontal portion disposed on the lower surface of the second external electrode, a second vertical portion extending from the second horizontal portion in the thickness direction and disposed on the second end surface of the encapsulation portion, and the second bonding force improving portion bent from an upper end of the second vertical portion and extending along and onto another inclined surface of the two inclined surfaces.

3. The tantalum capacitor of claim 1, wherein the encapsulation portion has two upper edges on an upper surface of the encapsulation portion and has two curved surfaces at the two upper edges, respectively, in the length direction,
the first plating layer includes a first horizontal portion disposed on the lower surface of the first external electrode, a first vertical portion extending from the first horizontal portion in the thickness direction and disposed on the first end surface of the encapsulation portion, and the first bonding force improving portion bent from an upper end of the first vertical portion and extending along and onto one curved surface of the two curved surfaces, and
the second plating layer includes a second horizontal portion disposed on the lower surface of the second external electrode, a second vertical portion extending from the second horizontal portion in the thickness direction and disposed on the second end surface of the encapsulation portion, and the second bonding force improving portion bent from an upper end of the second vertical portion and extending along and onto another curved surface of the two curved surfaces.

4. The tantalum capacitor of claim 1, wherein the encapsulation portion includes a first reduced-thickness portion and a second reduced-thickness portion at two end portions, respectively, of an upper surface of the encapsulation portion opposing each other in the length direction,
the first plating layer includes a first horizontal portion disposed on the lower surface of the first external electrode, a first vertical portion extending from the first horizontal portion in the thickness direction and disposed on the first end surface of the encapsulation portion, and the first bonding force improving portion bent from an upper end of the first vertical portion and extending along and onto an upper surface of the first reduced-thickness portion of the encapsulation portion, and
the second plating layer includes a second horizontal portion disposed on the lower surface of the second external electrode, a second vertical portion extending from the second horizontal portion in the thickness direction and disposed on the second end surface of the encapsulation portion, and the second bonding force improving portion bent from an upper end of the second vertical portion and extending along and onto an upper surface of the second reduced-thickness portion of the encapsulation portion.

5. The tantalum capacitor of claim 1, wherein an insulating layer is arranged between the encapsulation portion and the first and second external electrodes.

6. The tantalum capacitor of claim 5, further comprising:
a conductive binder disposed at least on a lower surface of the tantalum body in the thickness direction; and
a connection electrode disposed on an upper surface of the insulating layer in the thickness direction to be connected to the conductive binder.

7. The tantalum capacitor of claim 1, further comprising a conductive binder disposed between the tantalum body and a first vertical portion of the first plating layer, the first vertical portion being disposed on the first end surface of the encapsulation portion in the length direction.

8. A tantalum capacitor comprising:
a tantalum body including tantalum powder;

a tantalum wire disposed in the tantalum body and exposed to one surface thereof;

an encapsulation portion encapsulating the tantalum body and having first and second surfaces opposing each other, third and fourth surfaces connecting the first and second surfaces to each other and opposing each other, and fifth and sixth surfaces connecting the first and the second surfaces to each other, connecting the third and fourth surfaces to each other, and opposing each other, wherein an end of the tantalum wire is exposed through the fourth surface, and the encapsulation portion further includes first and second inclined surfaces that are inclined with respect to the third and fourth surfaces, respectively;

first and second external electrodes spaced apart from each other on the first surface of the encapsulation portion;

a first plating layer covering the third surface of the encapsulation portion and a first surface of the first external electrode, wherein one end of the first plating layer includes a first bonding force improving portion inclined to be disposed on the first inclined surface of the encapsulation portion; and a second plating layer covering the fourth surface of the encapsulation portion and a first surface of the second external electrode and connected to the tantalum wire, wherein one end of the second plating layer includes a second bonding force improving portion inclined to be disposed on the second inclined surface of the encapsulation portion, wherein the first and second bonding force improving portions each have any one of a flat shape with an inclined angle, a flat shape extending along a cutout groove of the encapsulation portion, or a shape concavely curved upwardly.

9. The tantalum capacitor of claim 8, wherein the inclined surfaces of the encapsulation portion are flat, the first plating layer includes a first horizontal portion disposed on the first surface of the first external electrode, a first vertical portion extending from the first horizontal portion and disposed on the third surface of the encapsulation portion, and the first bonding force improving portion bent from one end of the first vertical portion and extending along and onto the first inclined surface of the encapsulation portion, and the second plating layer includes a second horizontal portion disposed on the first surface of the second external electrode, a second vertical portion extending from the second horizontal portion and disposed on the fourth surface of the encapsulation portion, and the second bonding force improving portion bent from one end of the second vertical portion and extending along and onto the second inclined surface of the encapsulation portion.

10. The tantalum capacitor of claim 8, wherein the first and second inclined surfaces of the encapsulation portion are curved, the first plating layer includes a first horizontal portion disposed on the first surface of the first external electrode, a first vertical portion extending from the first horizontal portion and disposed on the third surface of the encapsulation portion, and the first bonding force improving portion bent from one end of the first vertical portion and curved to extend along and onto the first inclined surface of the encapsulation portion, and the second plating layer includes a second horizontal portion disposed on the first surface of the second external electrode, a second vertical portion extending from the second horizontal portion and disposed on the fourth surface of the encapsulation portion, and the second bonding force improving portion bent from one end of the second vertical portion and curved to extend along and onto the second inclined surface of the encapsulation portion.

11. The tantalum capacitor of claim 8, wherein an insulating layer is arranged between the encapsulation portion and the first and second external electrodes.

12. The tantalum capacitor of claim 11, further comprising:

a conductive binder disposed on a first surface of the tantalum body facing the first surface of the encapsulation portion; and a connection electrode disposed on one surface of the insulating layer in to be connected to the conductive binder.

13. The tantalum capacitor of claim 8, further comprising a conductive binder disposed between the tantalum body and a first vertical portion of the first plating layer, the first vertical portion being disposed on the third surface of the encapsulation portion.

14. A tantalum capacitor comprising:

a tantalum body including tantalum powder;

a tantalum wire disposed in the tantalum body and having one end exposed to one surface of the tantalum body in a length direction;

an encapsulation portion encapsulating the tantalum body;

first and second external electrodes spaced apart from each other in the length direction and disposed on a lower surface of the encapsulation portion in a thickness direction;

a first plating layer disposed on a first end surface of the encapsulation portion in the length direction and a lower surface of the first external electrode in the thickness direction to electrically connect the first external electrode to the tantalum body; and a second plating layer disposed on a second end surface of the encapsulation portion in the length direction and a lower surface of the second external electrode in the thickness direction to electrically connect the second external electrode to an exposed portion of the tantalum wire, wherein each of the first and second plating layers includes an inwardly bent portion bent inwardly toward a center of the encapsulation portion, the inwardly bent portion having any one of a flat shape with an inclined angle, a flat shape extending along a cutout groove of the encapsulation portion, or a shape concavely curved upwardly.

15. The tantalum capacitor of claim 14, wherein the encapsulation portion includes two upper edges on an upper surface of the encapsulation portion and has two inclined surfaces at the two upper edges, respectively, in the length direction, the inwardly bent portions of the first and second plating layers extend along and onto the two inclined surfaces, respectively, and the inwardly bent portions are flat.

16. The tantalum capacitor of claim 14, wherein the encapsulation portion has two upper edges on an upper surface of the encapsulation portion and has two curved surfaces at the two upper edges, respectively, in the length direction, the inwardly bent portions of the first and second plating layers extend along and onto the two curved surfaces, respectively, and the inwardly bent portions are curved.

17. The tantalum capacitor of claim 14, wherein the first plating layer includes a first horizontal portion disposed on the lower surface of the first external electrode and a first vertical portion extending from the first horizontal portion in the thickness direction and disposed on the first end surface of the encapsulation portion, and the second plating layer includes a second horizontal portion disposed on the lower surface of the second external electrode and a second vertical portion extending from the second horizontal portion in the thickness direction and disposed on the second end surface of the encapsulation portion.

18. The tantalum capacitor of claim 14, wherein the encapsulation portion includes a first reduced-thickness portion and a second reduced-thickness portion at two end portions, respectively, of an upper surface of the encapsulation portion opposing each other in the length direction.

19. The tantalum capacitor of claim 18, wherein the first plating layer includes a first horizontal portion disposed on the lower surface of the first external electrode, a first vertical portion extending from the first horizontal portion in the thickness direction and disposed on the first end surface of the encapsulation portion, and the first bonding force improving portion bent from an upper end of the first vertical portion and extending along and onto an upper surface of the first reduced-thickness portion, and the second plating layer includes a second horizontal portion disposed on the lower surface of the second external electrode, a second vertical portion extending from the second horizontal portion in the thickness direction and disposed on the second end surface of the encapsulation portion, and the second bonding force improving portion bent from an upper end of the second vertical portion and extending along and onto an upper surface of the second reduced-thickness portion.

\* \* \* \* \*